US005506016A

United States Patent [19]

Onodera et al.

[11] Patent Number: 5,506,016

[45] Date of Patent: Apr. 9, 1996

[54] LABEL

[75] Inventors: Show Onodera; Shinji Nakamura, both of Hyogo, Japan

[73] Assignees: NOF Corporation, Tokyo; Yushi-Seihin Co., Ltd., Osaka, both of Japan

[21] Appl. No.: 323,735

[22] Filed: Oct. 17, 1994

[30] Foreign Application Priority Data

| | | | |
|---|---|---|---|
| Oct. 15, 1993 | [JP] | Japan | 5-281936 |
| Apr. 13, 1994 | [JP] | Japan | 6-100609 |

[51] Int. Cl.$^6$ .......... B32B 3/00; C08F 282/12

[52] U.S. Cl. .......... 428/40; 283/81; 428/323; 428/328; 428/447; 428/704; 428/913

[58] Field of Search .......... 428/40, 323, 328, 428/447, 913, 704; 283/81

[56] References Cited

U.S. PATENT DOCUMENTS

| | | | |
|---|---|---|---|
| 3,202,535 | 8/1965 | Gaynes | 117/75 |
| 4,227,701 | 10/1980 | Tsuchida | 277/12 |
| 4,775,786 | 10/1988 | Yamano et al. | 235/490 |
| 4,971,858 | 11/1990 | Yamano et al. | 428/323 |
| 5,204,163 | 4/1993 | Nakatsuka et al. | 428/195 |
| 5,216,069 | 6/1993 | Kobori | 524/588 |
| 5,254,644 | 10/1993 | Kobori et al. | 525/478 |
| 5,258,577 | 11/1993 | Clements | 174/88 R |

FOREIGN PATENT DOCUMENTS

| | | |
|---|---|---|
| 0308518 | 3/1989 | European Pat. Off. . |
| 0402946 | 6/1990 | European Pat. Off. . |
| 62-142083 | 9/1987 | Japan . |
| WO8807937 | 10/1988 | Japan . |
| 1-272682 | 10/1989 | Japan . |
| 4-335083 | 11/1992 | Japan . |
| WO9307844 | 4/1993 | WIPO . |

*Primary Examiner*—Nasser Ahmad
*Attorney, Agent, or Firm*—Sughrue, Mion, Zinn, Macpeak & Seas

[57] ABSTRACT

A heat resistant label and a process for making the same are disclosed. The label is composed of a film made of a silicone resin in an amount of 20 to 95 wt % and an inorganic monocrystalline fiber in an amount of 80 to 5 wt %, together with an adhesive made of silicone resin in an amount of 10 to 80% and a metal powder in 90 to 20 wt %.

11 Claims, No Drawings

LABEL

FIELD OF THE INVENTION

The present invention relates to a label. More particularly, the present invention relates to a heat-resistant label which can be printed on a heat-resistant material by a heat treatment at an elevated temperature as high as 200° to 700° C.

BACKGROUND OF THE INVENTION

In various industrial fields such as food, machinery and chemical, a label on which letters, symbols, patterns, etc. have been printed, i.e., patterned label is stuck on products or their packaging materials to control the production process. A typical example of such a process control is a system utilizing a bar code printed label. In the bar code control system, data such as production conditions and price of products are electro-mechanically read out from the bar code label to control the production process and sales management.

However, an ordinary bar code label with adhesive obtained by applying an adhesive made of acrylic resin or the like to a film for label made of a resin or paper having a poor heat resistance is liable to be decomposed and evaporated both the film and adhesive under severe temperature conditions as high as not lower than 300° C. Thus, it cannot be used in industries requiring high temperature treatment processes such as ceramics, iron industry and glass industry, e.g., process for the preparation of television cathode ray tubes including sealing and annealing steps conducted at 400° to 600° C. Thus, films for label and adhesives which can withstand elevated temperatures as high as not lower than 300° C. have been desired.

On the other hand, heat-resistant films obtained by a process which comprises impregnating a woven cloth of long inorganic amorphous fiber, such as glass fiber and rock wool, with a heat-resistant binder resin such as silicone resin and polyamide resin, and then curing the binder have been heretofore known. Some of these heat-resistant films can withstand an elevated temperature as high as higher than 300° C. only for a short period of time.

However, if such a heat-resistant label is used to prepare a label which is used in the foregoing application, the label can be attached only on products having a plain and smooth surface because the film is rigid and thus exhibits an insufficient flexibility. When the label is exposed to a high temperature while being attached on the surface of a cathode ray tube or metal plate, it is discolorated or cannot withstand the thermal expansion of the cathode ray tube or metal plate and thus suffers from cracking and peeling. Thus, the use of such a heat-resistant label at the elevated temperatures as high as higher than 300° C. is limited. At elevated temperatures as high as higher than 400° C., such a heat-resistant label cannot substantially be used.

In order to solve the foregoing problems, JU-A-62-142083 (The term "JU-A" as used herein means an "unexamined published Japanese utility model application") proposes a heat-resistant bar code label for the process for the production of cathode ray tubes obtained by printing a bar code on a film for label made of ceramics, enamel, metal or the like with an ink made of a glassy inorganic compound having a low melting point (glass frit), an inorganic pigment and a solvent. However, the heat-resistant bar code label thus proposed is disadvantageous in that, though being sufficiently heat resistant, it is too rigid to be stuck on the curved surface of the product. The heat-resistant bar code is also disadvantageous in that when it is exposed to elevated temperatures as high as higher than 400° C. while being attached on the product with an adhesive, it falls off the product due to the thermal deterioration of the adhesive before the thermal deterioration of the label itself because the heat resistance of the adhesive is far lower than that of the label.

Under the circumstances, JP-A-1-272682 (The term "JP-A" as used herein means an "unexamined published Japanese patent application") and JP-A-4-335083 (U.S. Pat. No. 5,254,644) propose a heat-resistant adhesive comprising a silicone resin. However, since such a heat-resistant adhesive can withstand the elevated temperatures as high as higher 400° C. only for a short period of time, the foregoing heat-resistant bar code label will fall off the product within a short period of time when it is exposed to elevated temperatures as high as higher than 400° C. while being attached on the product with such a heat-resistant adhesive. Thus, the heat resistance of the label itself can be made the best use of only by screwing the label to the product or protecting the label in a pocket on the product. The application of such a heat-resistant adhesive in the actual production process is extremely limited and other ways takes much time.

In an attempt to eliminate these difficulties and realize an automatically-applicable heat-resistant label having an excellent flexibility which doesn't deteriorate or fall off the product at elevated temperatures, W088/07937 (U.S. Pat. No. 4,971,858, EP. 308518) proposes a label comprising a film made of a resin having a high glass frit content with a bar code printed on one side thereof with a heat-resistant ink and an adhesive having a low thermal decomposition temperature applied to the other side thereof. The glass frit used in the label melts when exposed to elevated temperatures. Even after the adhesive is deteriorated or decomposed, the glass frit thus molten can cause the bar code to be fusion-bonded-to and remain on the surface of the product.

However, the glass frit used in the foregoing label a solvent-insoluble powder having a grain diameter of several μms to several scores of μm. Thus, a film containing a large amount of glass frit is very brittle. Accordingly, even if such a label can be attached by means of a label sticking machine, it is often subject to breakage, causing the suspension of the production line in the worst case.

The inventors made extensive studies to accomplish the foregoing object. As a result, it was found that the use of a film comprising a specific resinous component and a specific inorganic fiber and an adhesive comprising a specific resin and a metal powder can provide a label having a satisfactory flexibility and heat resistance which exhibits an excellent external appearance and scratch resistance and doesn't fall off even after being treated at an elevated temperature. Thus, the present invention has been worked out.

SUMMARY OF THE INVENTION

In the light of the foregoing problems, the present invention is to provide a label excellent in flexibility and heat resistance and a heat-resistant label which can be printed on a heat-resistant material even at an elevated temperature.

According to an object of the present invention, there is to provide a label, comprising a film made of 20 to 95% by weight of a silicone resin and 5 to 80% by weight of an inorganic monocrystalline fiber with an adhesive made of 10 to 80% by weight of a silicone resin and 20 to 90% by weight of a metal powder attached thereto.

Another object of the present invention, there is to provide a process for baking the foregoing label on a heat-resistant material, which comprises sticking the foregoing label on the heat-resistant material, and then treating the material at a temperature of 200° to 700° C.

DETAILED DESCRIPTION OF THE INVENTION

The silicone resin to be used in the label of the present invention is a compound having an organopolysiloxane structure in its molecule. Examples of such a compound include straight silicone resin and modified silicone resin. These silicone resins may be used singly or in combination. Such a resin may be used as it is or in the form of solution in a solvent. In order to facilitate the film forming of the resin during the preparation of the label, the resin is preferably used in the form of solution in a solvent. The weight-average molecular weight of the silicone resin employable in the present invention is in the range of 200 to 5,000,000, preferably 500 to 2,000,000, more preferably 5,000 to 1,000,000.

In order to further enhance the flexibility of the label thus obtained, two or more silicone resins having different weight-average molecular weights are preferably used in admixture. Assuming that the weight-average molecular weight of the resin having a lower weight-average molecular weight is a, if the weight-average molecular weight of the resin having a greater weight-average molecular weight is in the range of 10a to 1,000a, preferably 50a to 500a, with the proviso that the weight-average molecular weight a is in the range of 200 to 5,000,000, preferably 500 to 2,000,000, more preferably 1,000 to 1,000,000, it exerts a great effect of enhancing the flexibility of the label. The mixing proportion of the two resins is preferably such that the proportion of the resin having a lower weight-average molecular weight is in the range of 5 to 50% by weight while that of the resin having a greater weight-average molecular weight is in the range of 50 to 95% by weight.

The straight silicone resin is an organopolysiloxane comprising hydrocarbon group as a main organic group. The organopolysiloxane may contain a hydroxyl group. Examples of the foregoing hydrocarbon group include aliphatic hydrocarbon groups and aromatic hydrocarbon groups. Preferred among these hydrocarbon groups are $C_{1-5}$ aliphatic hydrocarbon groups and $C_{6-12}$ aromatic hydrocarbon groups. These hydrocarbon groups may be used singly or in combination.

Examples of the $C_{1-5}$ aliphatic hydrocarbon groups include methyl group, ethyl group, propyl group, butyl group, pentyl group, vinyl group, allyl group, propenyl group, butenyl group, and pentenyl group. Examples of the $C_{6-12}$ aromatic hydrocarbon groups include phenyl group, methylphenyl group, ethylphenyl group, butylphenyl group tertiary butylphenyl group, naphthyl group, styryl group, allylphenyl group, and propenylphenyl group.

A straight silicone resin can be obtained by hydrolyzing one or more silane compounds including a chlorosilane compound or alkoxysilane compound containing the foregoing aliphatic hydrocarbon group or aromatic hydrocarbon group, and then condensing the hydrolysis product, or by hydrolyzing a mixture of the foregoing silane compound with tetrachlorosilane or tetraalkoxysilane, and then co-condensing the hydrolysis product.

Examples of the foregoing chlorosilane compound include methyltrichlorosilane, dimethyldichlorosilane, trimethylchlorosilane, methylethyldichlorosilane, vinylmethyldichlorosilane, vinyltrichlorosilane, phenyltrichlorosilane, diphenyldichlorosilane, methylphenyldichlorosilane, and vinylphenyldichlorosilane.

Examples of the alkoxysilane compound include methyltrimethoxysilane, dimethyldiethoxysilane, trimethylmethoxysilane, vinylmethyldimethoxysilane, vinyltributoxysilane, phenyltriethoxysilane, diphenyldimethoxysilane, methylphenyldipropoxysilane, and vinylphenyldimethoxysilane.

The modified silicone resin is an organopolysiloxane containing an organic group other than hydrocarbon group. Examples of such an organopolysiloxane include methoxy-containing silicone resin, ethoxy-containing silicone resin, epoxy-containing silicone resin, alkyd resin-modified silicone resin, acrylic resin-modified silicone resin, polyester resin-modified silicone resin, and epoxy resin-modified silicone resin.

These modified silicone resins can be obtained, e.g., by reacting the hydroxyl group of the foregoing straight silicone resin with an organic compound having a functional group reactive to the hydroxyl group such as carboxyl group, acid anhydride, hydroxyl group, aldehyde group, epoxy group and chloride group, by copolymerizing a straight silicone resin containing an unsaturated hydrocarbon group such as vinyl group with a compound having an unsaturated double bond, by hydrolyzing a modified silane compound obtained by the reaction of the foregoing silane compound with other organic compounds so that it undergoes condensation or co-condensation, or the like. The organic compound to be reacted may be a low molecular compound or a high molecular compound such as resin.

In the present invention, preferred for the film among the foregoing silicone resins is a so-called cold-setting silicone resin which is cured at a temperature of lower than 100° C. Preferred for the adhesive among the foregoing silicone resins is a so-called thermosetting silicone resin which is cured at a temperature of not lower than 100° C.

The inorganic monocrystalline fiber to be used in the present invention is a fiber made of inorganic monocrystals. In the light of the sharpness of printed pattern, the inorganic monocrystalline fiber preferably has an average length of not more than 200 μm, more preferably not more than 100 μm. In the light of the strength of the film, the average fiber length is preferably 3 or more times, more preferably 5 or more times the average fiber diameter.

Examples of such an inorganic monocrystalline fiber include silicon carbide whisker, silicon nitride whisker, alumina whisker, titanate whisker, zinc oxide whisker, magnesia whisker, aluminum borate whisker and wollastnite. These inorganic monocrystalline fibers all have an average fiber length 5 or more times greater than the average fiber diameter. Particularly preferred among these inorganic fibers is potassium titanate whisker, which is one of titanate whiskers.

The film to be used in the label of the present invention the foregoing two components, i.e., silicone resin and inorganic monocrystalline fiber as essential components. The amount of the silicone resin to be used is in the range of 20 to 95% by weight, preferably 30 to 90% by weight. The amount of the inorganic monocrystalline fiber to be used is in the range of 5 to 80% by weight, preferably 10 to 70% by weight. If these amounts deviate from the above defined ranges, the resulting label exhibits an insufficient heat resistance or poor flexibility.

In order to particularly enhance the heat resistance of such a film for label, it is preferred that the foregoing straight silicone resin accounts for part or whole of the silicone resin and the content of the straight silicone resin is in the range of not less than 50% by weight, preferably not less than 60% by weight.

The film for the label of the present invention may contain a resin having a decomposition initiation point of not higher than 350° C. in combination with the foregoing silicone resin and inorganic monocrystalline fiber to further enhance the flexibility of the label. If it is the case, the amount of the silicone resin may be in the range of 20 to 90% by weight, preferably 30 to 85% by weight, the amount of the inorganic monocrystalline fiber may be in the range of 60 to 5% by weight, preferably 55 to 8% by weight, and the content of the resin having a decomposition initiation point of not higher than 350° C. is in the range of 20 to 5% by weight, preferably 15 to 7% by weight. If the resin having a decomposition initiation point of not higher than 350° C. exceeds 20% by weight, the resulting film exhibits a reduced heat resistance.

The resin having a decomposition initiation point of not higher than 350° C. is one having a decomposition initiation point of not higher than 350° C., preferably not higher than 320° C. as determined by means of a thermobalance in the atmosphere. A resin having a decomposition initiation point of higher than 350° C. produces carbides when exposed to the elevated temperatures, impairing the external appearance of the label. Examples of the resin having a decomposition initiation point of not higher than 350° C. included poly(meth)acrylate, polyvinyl ester, poly-α-methylstyrene, and polyalkylene glycol. The average molecular weight of such a resin is normally not lower than 3,000, preferably not lower than 10,000. If the molecular weight of the resin is too small, the effect of enhancing the flexibility of the label is reduced.

The (meth)acrylate constituting the poly(meth) acrylate is an ester of (meth)acrylic acid with $C_{1-6}$ aliphatic alcohol. Examples of such a (meth)acrylic ester include methyl acrylate, butyl acrylate, hexyl acrylate, ethylene glycol monoacrylate, glycerin monoacrylate, glycerin diacrylate, methyl methacrylate, butyl methacrylate, hexyl methacrylate, ethylene glycol monomethacrylate, ethylene glycol dimethacrylate, glycerin monomethacrylate, and glycerin dimethacrylate.

A poly(meth)acrylate can be obtained by subjecting one or more of the foregoing (meth)acrylic ester to ordinary polymerization such as bulk polymerization, solution polymerization, suspension polymerization and emulsion polymerization. Such a poly(meth)acrylate exhibits a decomposition initiation point of about 170° C. to 320° C. Particularly preferred among these poly(meth)acrylates are polymethyl methacrylate and polymethyl acrylate. These poly(meth)acrylates exhibit a decomposition initiation point of about 200° C. to 300° C.

The vinyl ester constituting the polyvinyl ester is a $C_{1-6}$ aliphatic vinyl ester such as vinyl formate, vinyl acetate, vinyl propionate and vinyl hexanoate. The polyvinyl ester can be obtained by subjecting one or more of the foregoing aliphatic vinyl esters to conventional polymerization such as bulk polymerization, solution polymerization, suspension polymerization and emulsion polymerization. Such a polyvinyl ester exhibits a decomposition initiation point of about 180° C. to 320° C. Particularly preferred among these polyvinyl esters are polyvinyl acetates, which exhibit a decomposition initiation point of about 250° C. to 310° C.

The poly-α-methylstyrene can be obtained by subjecting α-methylstyrene to ordinary polymerization such as bulk polymerization, solution polymerization, suspension polymerization and emulsion polymerization. Such a poly-α-methylstyrene exhibits a decomposition initiation point of about 220° C. to 280° C.

The alkylene oxide constituting the polyalkylene oxide is a $C_{1-4}$ alkylene oxide, such as formaldehyde, ethylene oxide, propylene oxide and butylene oxide. The polyalkylene oxide can be obtained by subjecting one or more of these alkylene oxides to conventional addition polymerization. The resin, thus obtained, exhibits a decomposition initiation point of 150° C. to 300° C. Particularly preferred among these polyalkylene oxides are polymethylene oxide, polyethylene oxide, polypropylene oxide, and block copolymer of ethylene oxide and propylene oxide. These polyalkylene oxides exhibit a decomposition initiation point of about 180° C. to 280° C.

When the label is treated at a temperature of 200° C. to 700° C., the silicone resin generates a pyrolysis gas containing an organosiloxane as a main component which may contaminate adherends such as cathode ray tube or other parts present in the oven. The surface of the cathode ray tube or other parts thus contaminated exhibits a great contact angle with respect to water. It will repel cleaning water and thus cannot be thoroughly cleaned at the subsequent steps. Further, it will cause defects such as uneven coating at the following coating step. In order to solve these problems, it is preferred that a silicone resin crosslinking agent is added in an amount of 0.1 to 100 parts by weight, preferably 0.2 to 50 parts by weight based on 100 parts by weight of the silicone resin in the film. If the amount of the crosslinking agent to be added falls below the range, the contamination attributable to the silicone resin cannot be thoroughly reduced. On the contrary, if it exceeds this range, the resulting crosslinking is so dense that the label is brittle.

Examples of the silicone resin crosslinking agent include boric acids, borate esters, and organic metal compounds.

Examples of boric acids include orthoboric acid, methaboric acid, and boric anhydride. Examples of borate esters include ester of $C_{1-18}$, preferably $C_{1-8}$ alcohol with boric acid, such as trimethyl borate, triethyl borate, and trioctyl borate. Particularly preferred among these boric acids is orthoboric acid.

Examples of organic metal compounds include organic tin compound, organic lead compound, organic zinc compound, organic aluminum compound, and organic titanium compound. Preferred among these organic metal compounds is organic titanium compound.

Examples of organic titanium compound include alkoxytitanium compound having a $C_{1-32}$ alkoxy group, titanium acylate compound having a $C_{1-32}$ acyl group, and titanium chelate compound having a $C_{1-32}$ ligand. Specific examples of these organic titanium compounds include tetra-iso-propoxytitanium, tetrabutoxytitanium, tetrakis-2-ethylhexoxytitanium, titanium tetraacetate, and di-iso-propoxybis(acetylacetonato)titanium. Particularly preferred among these compounds is tetrabutoxytitanium.

For the purpose of further enhancing physical properties such as flexibility, printability, heat resistance and tensile strength of the film for label, other additives can be added. Examples of these additives include plasticizer, inorganic pigment, and heat resistance improving agent.

Examples of the plasticizer include aliphatic esters, aromatic esters, and phosphate esters. Specific examples of aliphatic esters include methyl laurate, butyl oleate, diethylene glycol dilaurate, and di(2-ethylbutoxyethyl) adipate. Specific examples of aromatic esters include dimethyl phthalate, dioctyl phthalate, di(2-ethylhexyl) phthalate, dilauryl phthalate, oleyl benzoate, and phenyl oleate. Specific examples of phosphate esters include tricresyl oleate, and trioctyl phosphate.

The addition of these plasticizers can provide a further improvement in the flexibility of the label. The amount of the plasticizer to be added is in the range of not more than 20 parts by weight, preferably not more than 10 parts by weight based on 100 parts by weight of the film. If it is too large, the flexibility of the label is too great to be easily peeled off a release paper on which it has been applied.

As the inorganic pigment there is used a pigment which is insusceptible to discoloration at elevated temperatures as high as not lower than 300° C. Examples of such a pigment include zinc oxide, aluminum oxide, aluminum hydroxide, lithopone, titanium oxide, chromium oxide, manganese oxide, nickel titanium yellow, chromium titanium yellow, red iron oxide, and luster pigment. Besides these color pigments, microsilica and calcium carbonate may be used. The addition of these pigments can provide a further enhancement of print contrast and a further improvement in the adhesibility of printing ink. The amount of the inorganic pigment to be added is in the range of not more than 200 parts by weight, preferably not more than 100 parts by weight based on 100 parts by weight of the film. If it exceeds this range, the label exhibits a reduced flexibility.

As the heat resistance improving agent there may be any known inorganic powder which improves the heat resistance of silicone resins. Examples of the inorganic powder include aluminum powder, zinc powder, aluminum oxide powder, zinc oxide powder, and zinc sulfate powder. The addition of such a heat resistance improving agent can provide a further enhancement of the heat resistance of the label. The amount of the heat resistance improving agent to be added is in the range of not more than 100 parts by weight, preferably not more than 50 parts by weight based on 100 parts by weight of the film. If the amount exceeds this range, the label exhibits a reduced flexibility.

Commercial silicone resins are available in the form of resin solution in a solvent. In order to further facilitate the film forming of the silicone resins, the solvent may further be added to the resin solution. The diluting or dispersing solvent is one having a boiling point of 0° C. to 300° C., preferably 25° C. to 200° C.

Examples of such a solvent include aliphatic hydrocarbons such as hexane, octane, decane and cyclohexane, aromatic hydrocarbons such as benzene, toluene, xylene, cumene and naphthalene, ketones such as acetone, methyl ethyl ketone and cyclohexanone, alcohols such as methanol, ethanol and 2-ethylhexanol, ethers such as ethylene glycol monomethyl ether and diethylene glycol dibutyl ether, esters such as methyl acetate, ethyl formate and ethyl acetoacetate, petroleum distillates such as gasoline, kerosine and petroleum distilled component, and water. Preferred among these solvents are aromatic hydrocarbons or alcohols which exhibit a good compatibility with silicone resins.

The diluting solvent is used in the amount of not more than 500 parts by weight, preferably not more than 200 parts by weight based on 100 parts by weight of the film. If the amount of the diluting solvent to be added exceeds this range, it takes much time to dry the film thus coated, and no more effects cannot be exerted. Thus, the addition of excessive amount of the diluting solvent gives an economical disadvantage.

The film for label of the present invention is prepared by mixing the foregoing components at normal temperature or elevated temperature. The mixing of these components may be effected by means of a dispersing machine such as disper, ball mill, sand mill, roll mill and homogenizer.

The solution for film of label is then dried to form a film. The preparation of the film can be accomplished by, for example, a process which comprises coating the solution for film on a release paper or on a mold coated with release agent by a known coating method or printing method, drying the material at normal temperature or elevated temperature to form a film, applying an adhesive to the surface of the film, peeling the film, and transferring the film to a release paper or the like, and then slitting the material to obtain a label. Alternatively, a process may be employed comprises applying a film resin solution to a release paper to which an adhesive has previously been applied, drying the material to form a film, and then slitting the material to obtain a label.

The adhesives constituting the label of the present invention comprise silicone resins in an amount of 10 to 80% by weight, preferably 20 to 70% by weight, and a metal powder in an amount of 90 to 20% by weight, preferably 80 to 30% by weight, if the amount of these components deviate from these ranges, a sufficient heat resistance cannot be obtained.

In order to particularly enhance the heat resistance of such an adhesive, it is preferred that the foregoing straight silicone resin accounts for part or whole of the silicone resin and the content of the straight silicone resin is in the range of not less than 50% by weight, preferably not less than 60% by weight based on the amount of the silicone resin.

The adhesives may comprise a borate compound in combination with these components to further enhance the heat resistance of the adhesive, wherein the amount of the silicone resin is in the range of 10 to 75% by weight, preferably 20 to 70% by weight, the metal powder is in the range of 80 to 24.9% by weight, preferably 75 to 29.5 by weight and the amount of the borate compound is in the range of 10 to 0.1% by weight, preferably 5 to 0.5% by weight. If the content of the boric compound falls below 0.1% by weight, it exerts a reduced effect of enhancing the heat resistance of the adhesive. On the contrary, if the content of the borate compound exceeds 10% by weight, the adhesive exhibit a reduced adhesion.

The metal powder is a powdered metal. It may be in any form such as fragment, sphere, block, granule, flake, and needle and fish scale. The grain size is in the range of 0.01 to 1,000 μm, preferably 0.1 to 500 μm is diameter. If the grain size deviates from this range, the heat resistance of the adhesive is reduced. The kind of metals to be used is not specifically limited but is preferably a metal which is relatively stable in the atmosphere. Examples of such a metal include zinc, nickel, aluminum, tin, iron, stainless steel, gold, silver, platinum, lead, copper, metallic silicon, titanium, and alloy thereof. Particularly preferred among these metals are zinc, aluminum, and stainless steel. The use of these metals can provide a further enhancement of the heat resistance of the adhesive.

The boric compound is a boric acid or derivative thereof. Examples of such a boric compound include boric acid, borate, and borate ester. Specific examples of boric acid include orthoboric acid, methaboric acid, and boric anhydride. Specific examples of borate include sodium borate, potassium borate, magnesium borate, calcium borate, zinc borate, and aluminum borate. Examples of borate ester include methyl borate, ethyl borate, butyl borate, octyl borate, and dodecyl borate. Particularly preferred among these boric compounds is orthoboric acid.

In order to further improve physical properties of the adhesive such as adhesion and processability, the adhesive may further comprise additives incorporated therein. Examples of these additives include plasticizer, inorganic pigment, and solvent.

Examples of the plasticizer include aliphatic esters, aromatic esters, and phosphoric esters. Specific examples of the alphatic esters include methyl taurate, butyl oleate, diethylene glycol dilaurate, and di(2-ethylbutoxyethyl) adipate. Specific examples of the aromatic esters include dimethyl phthalate, dioctyl phthalate, di(2-ethylhexyl) phthalate, dilauryl phthalate, oleyl benzoate, and phenyl oleate. Specific examples of the phosphoric esters include tricresyl phosphate, and trioctyl phosphate.

The addition of these plasticizers can provide a further enhancement of the adhesion of the adhesive. The amount of the plasticizer to be added is in the range of not more than 20 parts by weight, preferably not more than 10 parts by weight based on 100 parts by weight of the adhesive. If the amount of the plasticizer to be added exceeds this range, the adhesive exhibits too large an adhesion to make the label easily peelable from the release paper.

Examples of the inorganic pigment which is insusceptible to discoloration at an elevated temperature as high as not lower than 300° C. include zinc oxide, aluminum oxide, aluminum hydroxide, lithopone, titanium oxide, chromium oxide, manganese oxide, nickel titanium yellow, chromium titanium yellow, red iron oxide, and luster pigment. Besides these color pigments, extender pigments such as microsilica® and calcium carbonate may be used. The addition of these pigments can provide a further enhancement of the fluidity and processability of the adhesive. The amount of the pigment to be added is in the range of not more than 100 parts by weight, preferably not more than 50 parts by weight based on 100 parts by weight of the adhesive. If it exceeds this range, the adhesive exhibits a reduced adhesion.

The preparation of the foregoing adhesive can be accomplished by mixing the silicone resins and metal powder, optionally with the foregoing additives and solvent, at room temperature or elevated temperature. The mixing of these components may be effected by means of a dispersing machine such as disper, ball mill, sand mill, roll mill and homogenizer.

The adhesive, thus prepared, is dried, and then applied onto the film of the present invention to prepare a label. The preparation of the label of the present invention can be accomplished by a process which comprises applying the adhesive or its diluted solution to a release paper or a mold coated with a release agent by the foregoing known coating method or printing method, drying the material at room temperature or elevated temperature, and then slitting the material with the foregoing film contact-bonded to the adhesive surface to obtain a label. Alternatively, a process may be employed which comprises applying the adhesive or its diluted solution to the film, drying the material, transferring the material to a release paper or a mold coated with a release agent, and then slitting the material to obtain a label.

The label thus obtained may be directly used in the form of unprinted label with adhesive. In general, it is used in the form of label with adhesive having a pattern such as letter and symbol (e.g., bar code) printed thereon with a known heat-resistant ink, which is so-called, bar code label.

As the heat-resistant ink there may be used an ink which can withstand a heat treatment temperature, i.e., 200° C. or higher. Preferably, a heat-resistant ink comprising a metal oxide as a color pigment is used. As the metal oxide to be incorporated in the heat-resistant ink there may be used oxides of metal such as iron, cobalt, nickel, chromium, copper, manganese, titanium and aluminum, singly or in admixture. The metal oxide is supplied in the form of powder. Its grain size is in the range of 0.01 to 50 μm, preferably 0.1 to 10 μm in diameter. The preparation of the heat-resistant ink from the metal oxide is not limited. For example, the heat-resistant ink can be prepared by a process which comprises mixing the metal oxide with a binder in an amount of 1 to 1,000 parts, preferably 10 to 200 parts by weight based on 100 parts by weight of the metal oxide, and then dispersing or kneading the mixture, optionally with a solvent added thereto, by means of a dispersing machine such as disper, ball mill, roll mill and sand mill to obtain a solution or paste.

Examples of the binder to be incorporated in the heat-resistant ink include resin, wax, fats and oils, and low-melting glass. Specific examples of resin include silicone resin, hydrocarbon resin, vinyl resin, acetal resin, imide resin, amide resin, acrylic resin, polyester resin, polyurethane resin, alkyd resin, protein resin, and cellulose resin. For example, polyorganosiloxane, polystyrene, polyethylene, polypropylene, polyvinyl acetate, polyvinyl butyral, polyvinyl formal, polyimide, polyamide, poly (meth)acrylate, gelatin, cellulose derivative, polyvinyl alcohol, and polyvinyl pyrrolidone may be used, singly or in mixtures of copolymers of two or more of these resins. Examples of wax include paraffin wax, natural wax, higher alcohol wax, higher amide wax, higher aliphatic acid, and ester wax. Specific examples of these waxes include paraffin wax, polyethylene wax, beeswax, carnauba wax, stearyl alcohol, palmityl alcohol, oleyl alcohol, stearamide, oleamide, palmitylamide, ethylene bisstearamide, stearic acid, oleic acid, palmitic acid, myristic acid, ethyl stearate, butyl palmitate, palmityl stearate, and stearyl stearate. Examples of fats and oils include castor oil, soybean oil, linseed oil, olive oil, tallow, lard, and mineral oil. As the low-melting glass there may be used glass having a melting point of not higher than 700° C. or a solvent soluble glass. Examples of such glass include glass frit having a melting point of not higher than 700° C. and a grain size of 0.1 to 100 μm, preferably 0.2 to 50 μm in diameter, and water-glass. Examples of the solvent to be used in the dispersion or kneading of the mixture of the metal oxide and the binder include aliphatic hydrocarbons such as hexane, octane, decane and cyclohexane, aromatic hydrocarbons such as benzene, toluene, xylene, cumene and naphthalene, ketones such as acetone, methyl ethyl ketone and cyclohexanone, alcohols such as methanol, ethanol and 2-ethylhexanol, ethers such as ethylene glycol monomethyl ether and diethylene glycol dibutyl ether, esters such as methyl acetate, ethyl formate and ethyl acetoacetate, petroleum distillates such as gasoline, kerosine and petroleum distrilation oil, and water.

Such a diluting solvent is used in an amount of not more than 500 parts by weight, preferably not more than 200 parts by weight, based on 100 parts by weight of the sum of the amount of the metal oxide and the binder. If the amount of the diluting solvent exceeds this range, the resulting heat-resistant ink exhibits a reduced dispersion stability.

The heat-resistant ink, thus obtained, is used for a known printing process such as gravure offset printing, lithographic offset printing, letterpress printing, intaglio printing, silk screen printing, ink jet printing and ribbon printing.

The label of the present invention is excellent in flexibility as well as heat resistance and still exhibits excellent external appearance and scratch resistance even after heat treatment at an elevated temperature. Thus, the label of the present invention can be used as a label on which a pattern such as letter and symbol (e.g., bar code) is formed for the control of production process including high temperature step, to say nothing of room temperature step.

In particular, the label of the present invention can be used for the control of production processes in various industries having steps effected at temperatures as high as 200° to 700° C., more specifically for the control of process for the production of cathode ray tubes for TV including calcining, sealing, degassing and assembly.

The present invention will be further described in the following examples, which are not to be construded as being limited thereto.

PREPARATION EXAMPLE 1

(Preparation of film for label)

As silicone resins there were used a straight silicone resin A1 (trade name: KR-255, produced by Shin-etsu Chemical Co., Ltd.) and a silicone resin A2 (trade name: KR-271, produced by Shin-etsu Chemical Co., Ltd.). As an inorganic monocrystalline fiber there was used a potassium titanate whisker (trade name: TISMO TYPE D, produced by Otsuka Chemical Co., Ltd.). A silicone resin solution for film was prepared from these materials by the following method.

152 g of the straight silicone resin A1 (76 g: silicone resin; balance: xylene), 14 g of the straight silicone resin A2 (7 g: silicone resin; balance: xylene), 17 g of the potassium titanate whisker, 3 g of di(2-ethylhexyl) phthalate, and 17 g of xylene were charged into a 500-ml four-necked flask. The reaction mixture was then stirred at a temperature of 20° C. and 400 rpm by means of a turbine impeller mixer for 2 hours. The reaction mixture was further stirred at 3,000 rpm by means of an Auto Homomixer manufactured by Tokushu Kika K.K. for 10 minutes. The solution was then filtered through a 100-mesh sieve. The filtrate was then defoamed under reduced pressure to obtain a silicone resin solution for film.

Subsequently, the resin solution was applied onto a release paper to a thickness of 80 μm by means of a bar coater, dried by means of a 80° C. blowing drier for 2 hours, and then allowed to cool to prepare a film.

PREPARATION EXAMPLES 2 TO 21

Silicone resin solutions for film were prepared from compositions as set forth in Tables 1 and 2 in the same manner as in Preparation Example 1. These silicone resin solutions were then used to prepare films in the same manner as in Preparation Example 1. In Tables 1 and 2, the weight part of silicone resin indicates the weight of the resin content excluding the solvent. In the case where xylene which has been previously added to stabilize the silicone resin product was contained, the sum of the weight of the foregoing xylene and xylene used as a diluting solvent is set forth in the column of "xylene".

Table 1 also contains the formulation of Preparation Example 1 for reference.

PREPARATION EXAMPLE 22

(Preparation of adhesive)

As silicone resins there were used a straight silicone resin A2 (trade name: KR-271, produced by Shin-etsu Chemical Co., Ltd.) and a straight silicone resin A7 (trade name: KR-212, produced by Shin-etsu Chemical Co., Ltd.). As a metal powder there was used aluminum powder (flake aluminum powder; 100-mesh pass 100%; average grain diameter: 20 μm). An adhesive solution was prepared from these materials by the following method.

90 g of the straight silicone resin A2 (45 g: silicone resin, 48.9% by weight in the solid content in the adhesive; balance: xylene), 10 g of the straight silicone resin A7 (7 g: silicone resin (7.6% by weight in the solid content in the adhesive; balance: xylene), 40 g of aluminum powder (43.5% by weight in the solid content in the adhesive), and 17 g of xylene were charged into a 200-ml four-necked flask. The reaction mixture was then stirred at a temperature of 20° C. and 400 rpm by means of a turbine impeller mixer for 2 hours. The reaction mixture was further stirred at 3,000 rpm by means of an Auto Homomixer manufactured by Tokushu Kika K.K. for 10 minutes. The dispersion thus obtained was then filtered through a 100-mesh sieve. The filtrate was then defoamed under reduced pressure to obtain an adhesive solution.

Subsequently, the adhesive solution was applied onto a release paper to a thickness of 50 μm by means of a bar coater, dried by means of a 80° C. blowing drier for 10 minutes, and then allowed to cool to form an adhesive layer on the release paper.

PREPARATION EXAMPLES 23 TO 27

Adhesive solutions were prepared from compositions as set forth in Table 3 in the same manner as in Preparation Example 22. These silicone resin solutions were then used to form an adhesive layer on a release paper in the same manner as in Preparation Example 22. In Table 3, the weight part of silicone resin indicates the weight of the resin content excluding the solvent. In the case where xylene which has been previously added to stabilize the silicone resin product is contained, the sum of the weight of the foregoing xylene and xylene used as a diluting solvent is set forth in the column of "xylene".

Table 3 also contains the formulation of Preparation Example 22 for reference. Silicone resins, inorganic monocrystalline fibers, resins having a decomposition initiation point of not higher than 350° C., metal powders and borate compounds set forth in Table 3 are as follows:

Silicone resin

Straight silicone resin A1: trade name "KR-255", produced by Shin-etsu Chemical Co., Ltd. (weight-average molecular weight: $3\times10^5$)

Straight silicone resin A2: trade name "KR-271", produced by Shin-etsu Chemical Co., Ltd. (weight-average molecular weight: $6\times10^5$)

Modified silicone resin A3: trade name "KR-9706", produced by (acrylic resin-modified Shin-etsu Chemical Co., Ltd. silicone resin) (weight-average molecular weight: $1\times10^4$)

Modified silicone resin A4: trade name "SA-4", produced by (alkyd resin-modified Shin-etsu Chemical Co., Ltd. silicone resin) (weight-average molecular weight: $3\times10^4$)

Modified silicone resin A5: trade name "ES-1004", produced by (epoxy resin-modified Shin-etsu Chemical Co., Ltd. silicone resin) (weight-average molecular weight: $5\times10^4$)

Modified silicone resin A6: trade name "KR-5203", produced by (polyester resin-modified Shin-etsu Chemical Co., Ltd. silicone resin) (weight-average molecular weight: $1\times10^4$)

Straight silicone resin A7: trade name "KR-212", produced by (low molecular straight Shin-etsu Chemical Co., Ltd. silicone resin) (weight-average molecular weight: $1.5\times10^3$)

Inorganic monocrystalline fiber

Potassium titanate whisker: trade name "TISMO TYPE D", produced by Otsuka Chemical Co., Ltd. (average fiber length: 17 μm; average fiber diameter: 0.5 μm)
Silicon nitride whisker: average fiber length of 50 μm; average fiber diameter of 1 μm
Resin having a decomposition initiation point of not higher than 350° C.
Polymethyl methacrylate: decomposition initiation point of 289° C.; average molecular weight of 90,000
Polyvinyl acetate: decomposition initiation point of 270° C.; average molecular weight of 20,000
Metal powder
Aluminum powder: scaly powder; 100-mesh pass 100%; average grain diameter: 20 μm
Stainless steel powder: trade name "Stainless Flake SP Ace #FK05", produced by Tozai Chemical Co., Ltd.
Zinc powder: fragment-shaped powder; 100-mesh pass 100%; average grain diameter: 30 μm
Orthoboric compound
Orthoboric acid: produced by Sanei Kako K.K. (purity: 99.5%)
Methyl borate: produced by Tokyo Kasei Kogyo K.K.

EXAMPLE 1

(Preparation of label)

The film obtained in Preparation Example 1 was laminated with the release paper having an adhesive layer obtained in Preparation Example 22. The laminate was then cold-pressed under a pressure of 20 kg/cm$^2$ at room temperature for 60 minutes so that the two components were thoroughly integrated to each other. The material was cut into 10mm×50 mm size strips to prepare an unprinted label with adhesive.

EXAMPLES 2 TO 22

Unprinted labels with adhesive were prepared from combinations of film and adhesive set forth in Tables 4 and 5 in the same manner as in Example 1.

COMPARATIVE PREPARATION EXAMPLES 1 TO 8

Silicone resins for film were prepared from the formulations set forth in Table 6 in the same manner as in Preparation Example 1. These silicone resins were then used to prepare films in the same manner as in Preparation Example 1. In Table 6, the weight part of silicone resin indicates the weight of the resin content excluding the solvent. The sum of the weight of the solvent which has been previously added to stabilize the silicone resin or polyimide product and xylene or dimethylformamide used as a diluting solvent is set forth in the column of "other component".

"Polymethyl methacrylate", "straight silicone resin A1" and "straight silicone resin A2" as resin components and "potassium titanate whisker" as one of other components in Table 6 are the same as that in Tables 1 to 3. The other components are as follows:

Resin component
Polyimide resin: decomposition initiation point of 405° C.
Other components
Glass frit: trade name "ASF-1307F", produced by Asahi-Glass Co., Ltd.
Glass fiber: trade name "GF-C 150A", produced by Asahi Fiber Glass Co., Ltd. (average fiber length: 70 μm; average fiber diameter: 11 μm)

COMPARATIVE EXAMPLE 1

The film obtained in Comparative Preparation Example 1 was laminated with the release paper having an adhesive layer obtained in Preparation Example 22. The laminate was then processed in the same manner as in Example 1 to prepare an unprinted label with adhesive.

COMPARATIVE EXAMPLES 2 TO 11

Unprinted labels with adhesive were prepared from combinations of film and adhesive set forth in Table 7 in the same manner as in Example 1. Table 7 also shows the combination of film and adhesive used in Comparative Example 1 for reference.

COMPARATIVE EXAMPLES 12 TO 13

Unprinted labels with adhesive were prepared films for label to be used in the present invention set forth in Table 7 and the following commercial heat-resistant adhesives, respectively.

Adhesive G1: trade name "SD4560", produced by Toray Silicone Co., Ltd.
Adhesive G2: trade name "X-40-3111", produced by Shin-etsu Chemical Co., Ltd.

These commercial adhesives were each used in accordance with the respective standard instruction to form an adhesive layer on a release paper.

COMPARATIVE EXAMPLE 14

A commercial teflon sheet (thickness: 100 μm; decomposition initiation point: 460° C.) was used. It was then laminated with the same adhesive layer as obtained in Preparation Example 1 on a release paper. The laminate was thoroughly subjected to contact bonding. The laminate was then cut into 10 mm×50 mm size strips to prepare an unprinted label with adhesive.

The unprinted labels obtained in Examples 1 to 22 and Comparative Examples 1 to 14 were then subjected to flexibility test, heat resistance test, scratch resistance test, thermal peel test and silicone contamination test in the following manner. The results of these tests are as set forth in Table 8 (Examples 1 to 22) and Table 9 (Comparative Examples 1 to 14).

COMPARATIVE EXAMPLE 15

Table 9 also shows the results of tests of a commercial ceramic label [trade name "Ceralabel Green 450", produced by K.K. Sigmax] as Comparative Example 15.

Flexibility test

The unprinted labels of the foregoing examples and comparative examples were peeled off the release paper by 23 sheets each example. These 23 sheets of labels were then manually press fitted on the surface of 23 glass tubes having a diameter of 1 cm, respectively, in such a manner that the long side was parallel to the axial direction of the glass tube. A brittle label having an insufficient flexibility cannot follow the curvature of the glass tube and thus suffers from cracking. The number of occurrence of cracking was used to evaluate the sticking properties of the label. The criterion of the evaluation are as follows:

E: All 23 sheets are stickable
G: 1 to 4 of 23 sheets show cracking
F: 5 to 11 of 23 sheets show cracking
P: 12 or more of 23 sheets show cracking or are too rigid to be stuck on the glass tube Heat resistance test The unprinted labels were each stuck on a glass tube in the same manner as in the flexibility test. Three glass tubes each label were heated at various temperatures, i.e., 250° C., 300° C., 350° C., 400° C., 450° C. and 500° C., for 1 hour, and then allowed to cool to room temperature. These specimens were then observed for external appearance. The highest temperature at which all the three specimens show no defect in external appearance such as yellowing, peeling and cracking was defined as the heat-resisting temperature. The specimens which had been evaluated as poor in the flexibility test were not subjected to the heat resistance test.

Scratch resistance test

The label which had been subjected to the heat resistance test was lightly rubbed with a black cotton cloth. The scratch resistance of the label was judged by the following three-step criterion:

G: No contamination on the cotton cloth

F: Some pigment is observed attached to the cotton cloth, but the label is maintained P: The label is scratched or completely peeled off Thermal peel test The unprinted labels were heated to a temperature of 450° C. for 1 hour by one sheet each example. The label was then allowed to cool to normal temperature. An adhesive tape (trade name "Scotch® Clear Tape", produced by Sumitomo 3M) was then attached on the label. The adhesive tape was then contact-bonded to the label by strongly depressing a finger against the laminate. The adhesive tape was then peeled off the label. A label which exhibits a weak adhesivity after being exposed to elevated temperature is attached to the adhesive tape and thus is peeled off the glass tube together with the adhesive tape. The degree of peeling was used to evaluate the thermal adhesivity. The criterion of evaluation are as follows:

E: No peeling observed

G: Less than 10% of the entire surface of the label is peeled off the glass tube F: 10 to 50% of the entire surface of the label is peeled off the glass tube P: Not less than 50% of the entire surface of the label is peeled off the glass tube Gas contamination test The unprinted labels were attached to the center part of a 100 mm×100 mm×2 mm size glass plate by one sheet each example. The glass plate was then charged into a stainless steel vessel with an inner volume of 4.5 l (internal dimension: 150 mm×150 mm×200 mm) having a 2-cm diameter air vent in the center part of the top thereof. The material was then heated to a temperature of from 30° C. to 450° C. for 30 minutes. It was then kept at a temperature of 450° C. for 30 minutes. The material was then allowed to cool to a temperature of 30° C. for 1 hour. The material was then taken out from the vessel. The contact angle of a point where is 1 cm apart from the end of the label on glass plate with respect to water was immediately measured. The measurement was conducted on 5 points each specimen. The results of the measurements were then averaged. If the surface of the glass plate is contaminated by decomposition gas from the label, it exhibits an increased contact angle. The glass plate having no label attached thereto was conducted the same treatment and exhibited a contact angle of 4 degrees or less, which were hardly measured.

The results of these tests are set forth in Tables 8 and 9.

As can be seen in the results set forth in Tables 8 and 9, Examples 1 to 22, in which the resin compositions for label of the present invention are used, can provide a drastic enhancement of the flexibility as compared with the commercial heat-resistant ceramic label of Comparative Example 15 and show an excellent heat resistance and an excellent scratch resistance after heat resistance test. In particular, if a silicone resin containing a metal powder and a boric compound are used as an adhesive, these resin compositions can also provide excellent thermal peeling properties. Further, in Examples 20, 21 and 22, wherein a silicone resin crosslinking agent is added to a film for label, the glass plate to which the label is attached exhibits a small contact angle and thus shows no gas contamination. On the other hand, in Comparative Examples 1, 2, 3 and 9, wherein resins other than silicone resin are used as films, Comparative Example 4, wherein glass fiber as amorphous inorganic fiber is used instead of inorganic monocrystalline fiber, and Comparative Examples 5 to 7 and 10, wherein glass frit is used, little or no enhancement of the flexibility of the label can be provided, and the heat resistance of the labels is insufficient. In Comparative Examples 8 and 11, wherein titanium oxide powder is used instead of inorganic monocrystalline fiber, though silicone resins being used, the resulting labels exhibit a good flexibility but show a reduced heat resistance as well as poor scratch resistance and thermal peeling properties.

Further, the labels with adhesive prepared from the film for label to be used in the present invention and a commercial heat-resistant adhesive in Comparative Examples 12 and 13 exhibit poor thermal peeling properties. Moreover, in Comparative Example 14, wherein a teflon sheet is used, the resulting label exhibits an enhanced flexibility but shows a remarkably poor heat resistance.

TABLE 1

| | Preparation Example | | | | | | | | | | |
|---|---|---|---|---|---|---|---|---|---|---|---|
| | 1 | 2 | 3 | 4 | 5 | 6 | 7 | 8 | 9 | 10 | 11 |
| Ingredients (parts by weight) | | | | | | | | | | | |
| Silicone resin | | | | | | | | | | | |
| Straight silicone resin A1 | 76 | 80 | — | — | — | — | 70 | 65 | — | — | 72 |
| Straight silicone resin A2 | 7 | — | — | — | — | — | 10 | 5 | 5 | 12 | 8 |
| Modified silicone resin A3 | — | — | 70 | — | — | — | — | — | 60 | — | — |
| Modified silicone resin A4 | — | 5 | — | 70 | — | — | — | — | — | 40 | — |
| Modified silicone resin A5 | — | — | — | — | 85 | — | — | — | — | — | — |
| Modified silicone resin A6 | — | — | — | — | — | 70 | — | — | — | — | — |
| Straight silicone resin A7 | — | — | — | — | — | — | — | — | — | — | — |
| Inorganic monocrystalline fiber | | | | | | | | | | | |

TABLE 1-continued

| | Preparation Example | | | | | | | | | | |
|---|---|---|---|---|---|---|---|---|---|---|---|
| | 1 | 2 | 3 | 4 | 5 | 6 | 7 | 8 | 9 | 10 | 11 |
| Potassium titanate whisker | 17 | — | 20 | 20 | 15 | 30 | — | 18 | 35 | 40 | 20 |
| Silicon nitride whisker | — | 15 | — | — | — | — | 20 | — | — | — | — |
| Resin having a decomposition initiation point of not higher than 350° C. | | | | | | | | | | | |
| Polymethyl methacrylate | — | — | — | 10 | — | — | — | 12 | — | — | — |
| Polyvinyl acetate | — | — | 10 | — | — | — | — | — | — | 8 | — |
| Others | | | | | | | | | | | |
| Di(2-ethylhexyl)phthalate | 3 | — | — | — | — | — | — | — | — | — | 2 |
| Titanium oxide powder | — | — | 10 | — | 5 | 15 | — | 24 | — | — | — |
| Aluminum oxide powder | — | — | — | 30 | — | — | — | — | — | — | — |
| Aluminum hydroxide powder | — | — | — | — | — | 50 | — | — | — | — | — |
| Aluminum powder | — | — | — | — | 25 | — | — | — | — | — | — |
| Xylene | 100 | 100 | 100 | 100 | 100 | 200 | 100 | 200 | 100 | 150 | 100 |

TABLE 2

| | Preparation Example | | | | | | | | | |
|---|---|---|---|---|---|---|---|---|---|---|
| | 12 | 13 | 14 | 15 | 16 | 17 | 18 | 19 | 20 | 21 |
| Ingredients (parts by weight) | | | | | | | | | | |
| Silicone resin | | | | | | | | | | |
| Straight silicone resin A1 | 35 | — | 60 | 55 | 60 | 50 | 40 | 76 | 60 | 40 |
| Straight silicone resin A2 | 4 | 2 | — | — | — | 5 | — | 7 | — | — |
| Modified silicone resin A3 | 22 | | — | — | — | 5 | — | — | — | — |
| Modified silicone resin A4 | — | 50 | — | — | — | — | — | — | — | — |
| Modified silicone resin A5 | — | — | — | — | — | — | — | — | — | — |
| Modified silicone resin A6 | — | — | — | — | — | — | — | — | — | — |
| Straight silicone resin A7 | — | — | — | 10 | 10 | 5 | 10 | — | 10 | 10 |
| Inorganic monocrystalline fiber | | | | | | | | | | |
| Potassium titanate whisker | 32 | 40 | 20 | 35 | 30 | 30 | 40 | 17 | 30 | 40 |
| Silicon nitride whisker | — | — | 10 | — | — | — | — | — | — | — |
| Resin having a decomposition initiation point of not higher than 350° C. | | | | | | | | | | |
| Polymethyl methacrylate | 7 | — | 10 | — | 5 | 5 | — | — | — | 5 |
| Polyvinyl acetate | — | 8 | — | — | — | 5 | — | — | — | 5 |
| Others | | | | | | | | | | |
| Di(2-ethylhexyl)phthalate | 2 | 1 | — | 1 | 2 | | 1 | 3 | 2 | 1 |
| Titanium oxide powder | 11 | — | — | — | — | 10 | — | — | — | — |
| Aluminum oxide powder | — | — | — | 35 | — | 20 | — | — | — | — |
| Aluminum hydroxide powder | — | — | 30 | — | 30 | 10 | 30 | — | 30 | 30 |
| Orthoboric acid | — | — | — | — | — | — | — | 15 | — | — |
| Tetra-n-butoxytitanium | — | — | — | — | — | — | — | — | 8 | — |
| Tetraisopropoxytitanium | — | — | — | — | — | — | — | — | — | 2 |
| Xylene | 120 | 200 | 150 | 100 | 100 | 100 | 100 | 100 | 100 | 100 |

TABLE 3

| | Preparation Example | | | | | |
|---|---|---|---|---|---|---|
| | 22 | 23 | 24 | 25 | 26 | 27 |
| Ingredients (parts by weight) | | | | | | |
| Silicone resin | | | | | | |
| Straight silicone resin A1 | | | 42 | | 10 | |
| Straight silicone resin A2 | 48.9 | 36 | | 50 | 40 | 42 |
| Modified silicone resin A3 | | 5 | | | | |

TABLE 3-continued

| | Preparation Example | | | | | |
|---|---|---|---|---|---|---|
| | 22 | 23 | 24 | 25 | 26 | 27 |
| Modified silicone resin A4 | | | 11 | | | |
| Modified silicone resin A5 | | | | | | |
| Modified silicone resin A6 | | | 4 | | 5 | |
| Straight silicone resin A7 | 7.6 | 10 | | 8 | 5 | 8 |
| Metal powder | | | | | | |
| Aluminum powder | 43.5 | | | 40 | 20 | |

TABLE 3-continued

| | Preparation Example | | | | | |
|---|---|---|---|---|---|---|
| | 22 | 23 | 24 | 25 | 26 | 27 |
| Stainless steel powder | | 49 | | | 20 | 50 |
| Zinc powder | | | 43 | | | |
| Boric compound | | | | | | |
| Orthoboric acid | | | | 2 | | 1.5 |
| Methyl borate | | | | | 3 | |
| Others | | | | | | |
| Di(2-ethylhexyl)phthalate | | | 3 | 1 | 1 | |
| Titanium oxide powder | | | 2 | | | |
| Aluminum oxide powder | | | | | | |
| Aluminum hydroxide powder | | | 2 | | 5 | |
| Xylene | 52.2 | 50 | 50 | 60 | 60 | 60 |

TABLE 4

| | Label | Film | Adhesive |
|---|---|---|---|
| Label of the present invention | Example 1 | Preparation Example 1 | Preparation Example 22 |
| | Example 2 | Preparation Example 2 | Preparation Example 22 |
| | Example 3 | Preparation Example 3 | Preparation Example 22 |
| | Example 4 | Preparation Example 4 | Preparation Example 22 |
| | Example 5 | Preparation Example 5 | Preparation Example 22 |
| | Example 6 | Preparation Example 6 | Preparation Example 22 |
| | Example 7 | Preparation Example 7 | Preparation Example 22 |
| | Example 8 | Preparation Example 8 | Preparation Example 22 |

TABLE 4-continued

| | Label | Film | Adhesive |
|---|---|---|---|
| | Example 9 | Preparation Example 9 | Preparation Example 22 |
| | Example 10 | Preparation Example 10 | Preparation Example 22 |
| | Example 11 | Preparation Example 11 | Preparation Example 22 |

TABLE 5

| | Label | Film | Adhesive |
|---|---|---|---|
| Label of the present invention | Example 12 | Preparation Example 12 | Preparation Example 22 |
| | Example 13 | Preparation Example 13 | Preparation Example 22 |
| | Example 14 | Preparation Example 14 | Preparation Example 22 |
| | Example 15 | Preparation Example 15 | Preparation Example 23 |
| | Example 16 | Preparation Example 16 | Preparation Example 24 |
| | Example 17 | Preparation Example 17 | Preparation Example 25 |
| | Example 18 | Preparation Example 18 | Preparation Example 26 |
| | Example 19 | Preparation Example 11 | Preparation Example 27 |
| | Example 20 | Preparation Example 19 | Preparation Example 22 |
| | Example 21 | Preparation Example 20 | Preparation Example 24 |
| | Example 22 | Preparation Example 21 | Preparation Example 26 |

TABLE 6

| | | Comparative Preparation Example | | | | | | | |
|---|---|---|---|---|---|---|---|---|---|
| | Ingredients (parts by weight) | 1 | 2 | 3 | 4 | 5 | 6 | 7 | 8 |
| Resin | Silicone resin | | | | | | | | |
| | Straight silicone resin A1 | | | | 76 | | | | 40 |
| | Straight silicone resin A2 | | | | 7 | | | | 10 |
| | Resin having a decomposition initiation point of not higher than 350° C. | | | | | | | | |
| | Polymethyl methacrylate | | | 70 | | 30 | 20 | | |
| | Resin having a decomposition initiation point of higher than 350° C. | | | | | | | | |
| | Polymethyl resin | 60 | 50 | | | | | 20 | |
| Others | Inorganic monocrystalline fiber | | | | | | | | |
| | Potassium titanate whisker | 38 | 30 | 19 | | | | | |
| | Metal powder | | | | | | | | |
| | Aluminum powder | | 20 | 10 | | | 10 | 10 | |
| | Plasticizer | | | | | | | | |
| | Di(2-ethylhexyl)phthalate | 2 | | 1 | 3 | | | 2 | 2 |
| | Inorganic pigment | | | | | | | | |
| | Titanium oxide powder | | | | | 10 | | 8 | 48 |
| | Solvent | | | | | | | | |
| | Xylene | | | 100 | 100 | 100 | 100 | | 100 |
| | Dimethylformamide | 100 | 100 | | | | | 100 | |
| | Others | | | | | | | | |

TABLE 6-continued

| Ingredients (parts by weight) | Comparative Preparation Example 1 | 2 | 3 | 4 | 5 | 6 | 7 | 8 |
|---|---|---|---|---|---|---|---|---|
| Glass frit | | | | | 60 | 50 | 40 | |
| Glass fiber | | | | 17 | | | | |

TABLE 7

| | Label | Film | Adhesive |
|---|---|---|---|
| Label of Comparative Example | Comparative Example 1 | Comparative Preparation Example 1 | Preparation Example 22 |
| | Comparative Example 2 | Comparative Preparation Example 2 | Preparation Example 22 |
| | Comparative Example 3 | Comparative Preparation Example 3 | Preparation Example 22 |
| | Comparative Example 4 | Comparative Preparation Example 4 | Preparation Example 22 |
| | Comparative Example 5 | Comparative Preparation Example 5 | Preparation Example 22 |
| | Comparative Example 6 | Comparative Preparation Example 6 | Preparation Example 22 |
| | Comparative Example 7 | Comparative Preparation Example 7 | Preparation Example 22 |
| | Comparative Example 8 | Comparative Preparation Example 8 | Preparation Example 22 |
| | Comparative Example 9 | Comparative Preparation Example 1 | Preparation Example 25 |
| | Comparative Example 10 | Comparative Preparation Example 5 | Preparation Example 26 |
| | Comparative Example 11 | Comparative Preparation Example 8 | Preparation Example 27 |
| | Comparative Example 12 | Comparative Preparation Example 17 | G1 |
| | Comparative Example 13 | Comparative Preparation Example 18 | G2 |

TABLE 8

| | Flex-iblity | Heat resisting critical temperature (°C.) | Scratch resistance | Thermal peeling proper-ties | Gas contami-nation (contact angle) |
|---|---|---|---|---|---|
| Example 1 | E | ≧500 | G | G | 58° |
| Example 2 | G | 400 | F | F | 58° |
| Example 3 | E | 350 | F | F | 58° |
| Example 4 | E | 350 | G | F | 72° |
| Example 5 | G | 350 | G | G | 70° |
| Example 6 | F | 400 | F | F | 66° |
| Example 7 | G | 400 | G | F | 64° |
| Example 8 | E | ≧500 | G | G | 74° |
| Example 9 | F | 350 | G | F | 62° |
| Example 10 | E | 400 | G | F | 55° |
| Example 11 | E | ≧500 | G | G | 50° |
| Example 12 | E | 450 | G | G | 58° |
| Example 13 | E | 450 | G | F | 78° |
| Example 14 | E | ≧500 | G | G | 56° |
| Example 15 | E | ≧500 | G | G | 62° |
| Example 16 | E | ≧500 | G | G | 66° |
| Example 17 | E | ≧500 | G | E | 60° |
| Example 18 | E | ≧500 | G | E | 60° |
| Example 19 | E | ≧500 | G | E | 54° |
| Example 20 | E | ≧500 | G | G | 4° |
| Example 21 | E | ≧500 | G | E | 4° |
| Example 22 | E | ≧500 | G | E | 8° |

TABLE 9

| | Flex-iblity | Heat resisting critical temperature (°C.) | Scratch resistance | Ther-mal peeling proper-ties | Gas contami-nation (contact angle) |
|---|---|---|---|---|---|
| Comparative Example 1 | F | 250 | P | P | 16° |
| Comparative Example 2 | P | — | — | — | 14° |
| Comparative Example 3 | F | 250 | P | P | 8° |
| Comparative Example 4 | F | 300 | P | P | 80° |
| Comparative Example 5 | P | — | — | — | 24° |
| Comparative Example 6 | P | — | — | — | 16° |
| Comparative Example 7 | F | 300 | P | P | 10° |
| Comparative Example 8 | E | 300 | P | P | 74° |
| Comparative Example 9 | F | 250 | P | P | 22° |
| Comparative Example 10 | P | — | — | — | 18° |
| Comparative Example 11 | E | 300 | P | P | 78° |
| Comparative Example 12 | E | 350 | G | P | 82° |
| Comparative Example 13 | E | 350 | G | P | 78° |
| Comparative Example 14 | E | <250 | P | P | 10° |
| Comparative Example 15 | P | — | — | — | 22° |

While the invention has been described in detail and with reference to specific embodiments thereof, it will be apparent to one skilled in the art that various changes and modifications can be made therein without departing from the spirits and scope thereof.

What is claimed:

1. A label which comprises a film comprising 20 to 95% by weight of a silicone resin and 5 to 80% by weight of an inorganic monocrystalline fiber, and an adhesive attached thereto comprising 10 to 80% by weight of a silicone resin and 20 to 90% by weight of a metal powder.

2. The label according to claim 1, wherein said silicone resin constituting the film and adhesive has a weight-average molecular weight in the range of 200 to 5,000,000.

3. The label according to claim 1, wherein said silicone resin constituting the film is a mixture of a first silicone resin having a weight-average molecular weight as small as 200 to 500,000 and a second silicone resin having a weight-average molecular weight as large as 10 to 1,000 times that of the first silicone resin in a proportion of 5:95 to 50:50 by % by weight.

4. The label according to claim 1, wherein said silicone resin constituting the film is cured at a temperature of lower than 100° C.

5. The label according to claim 1, wherein said silicone resin constituting the adhesive is cured at a temperature of not lower than 100° C.

6. The label according to claim 1, wherein said silicone constituting the film and adhesive contains a straight silicone resin in an amount of not less than 50% by weight.

7. The label according to claim 1, wherein said film comprises 20 to 90% by weight of a silicone resin, 5 to 60% by weight of an inorganic monocrystalline fiber and 5 to 20% by weight of a resin having a decomposition initiation point of not higher than 350° C.

8. The label according to claim 1, wherein said film contains a silicone resin crosslinking agent in an amount of 0.1 to 100 parts by weight based on 100 parts by weight of silicone resin.

9. The label according to claim 8, wherein said silicone resin crosslinking agent comprises one or more compounds selected from the group consisting of boric acid, organic boron compound and organic metal compound.

10. The label according to claim 1, wherein said adhesive comprises of 10 to 75% by weight of a silicone resin, 24.9% by weight of a metal powder, and 0.1 to 10% by weight of a boric compound.

11. The labels according to claim 10, wherein said metal powder comprises one or more group selected from aluminum powder, zinc powder and stainless steel powder.

* * * * *